United States Patent [19]

Kurschat

[11] Patent Number: 5,064,209
[45] Date of Patent: Nov. 12, 1991

[54] COMBINED TRAILER/WHEELCHAIR

[76] Inventor: Erich G. Kurschat, 1660 Rochester Rd., Box 203, Lakeville, Mich. 48036

[21] Appl. No.: 621,013

[22] Filed: Dec. 3, 1990

[51] Int. Cl.⁵ ............... B60K 27/00; B62M 1/14; B62B 7/00
[52] U.S. Cl. .................. 280/204; 280/250.1; 280/485; 280/502; 280/47.4; 297/DIG. 4
[58] Field of Search ........... 280/204, 250.1, 292, 280/304.1, 483, 495, 500, 47.11, 47.25, 47.4, 502, 485; 297/DIG. 4

[56] References Cited

U.S. PATENT DOCUMENTS

| | | | |
|---|---|---|---|
| 4,452,327 | 6/1984 | Mowat et al. | 280/250.1 X |
| 4,471,972 | 9/1984 | Young | 280/250.1 X |
| 4,695,071 | 9/1987 | Johnston | 280/204 |
| 4,708,219 | 11/1987 | Cresswell | 280/250.1 X |
| 4,757,868 | 7/1988 | Cresswell | 280/250.1 X |

FOREIGN PATENT DOCUMENTS 3301408  9/1984  Fed. Rep. of Germany ... 280/304.1

Primary Examiner—Charles A. Marmor
Assistant Examiner—Kevin Hurley
Attorney, Agent, or Firm—Reising, Ethington, Barnard, Perry & Milton

[57] ABSTRACT

The invention relates to a combined trailer/wheelchair which can either be towed behind a powered cart or be manually pushed as a wheelchair and which includes features such as a removable or telescoping tow bar, an articulated hitch mechanism adapted to connect the tow bar to a towing cart, arms to prevent inadvertent rearward tipping of the trailer when uncoupled from a towing cart, and easy disassembly.

9 Claims, 5 Drawing Sheets

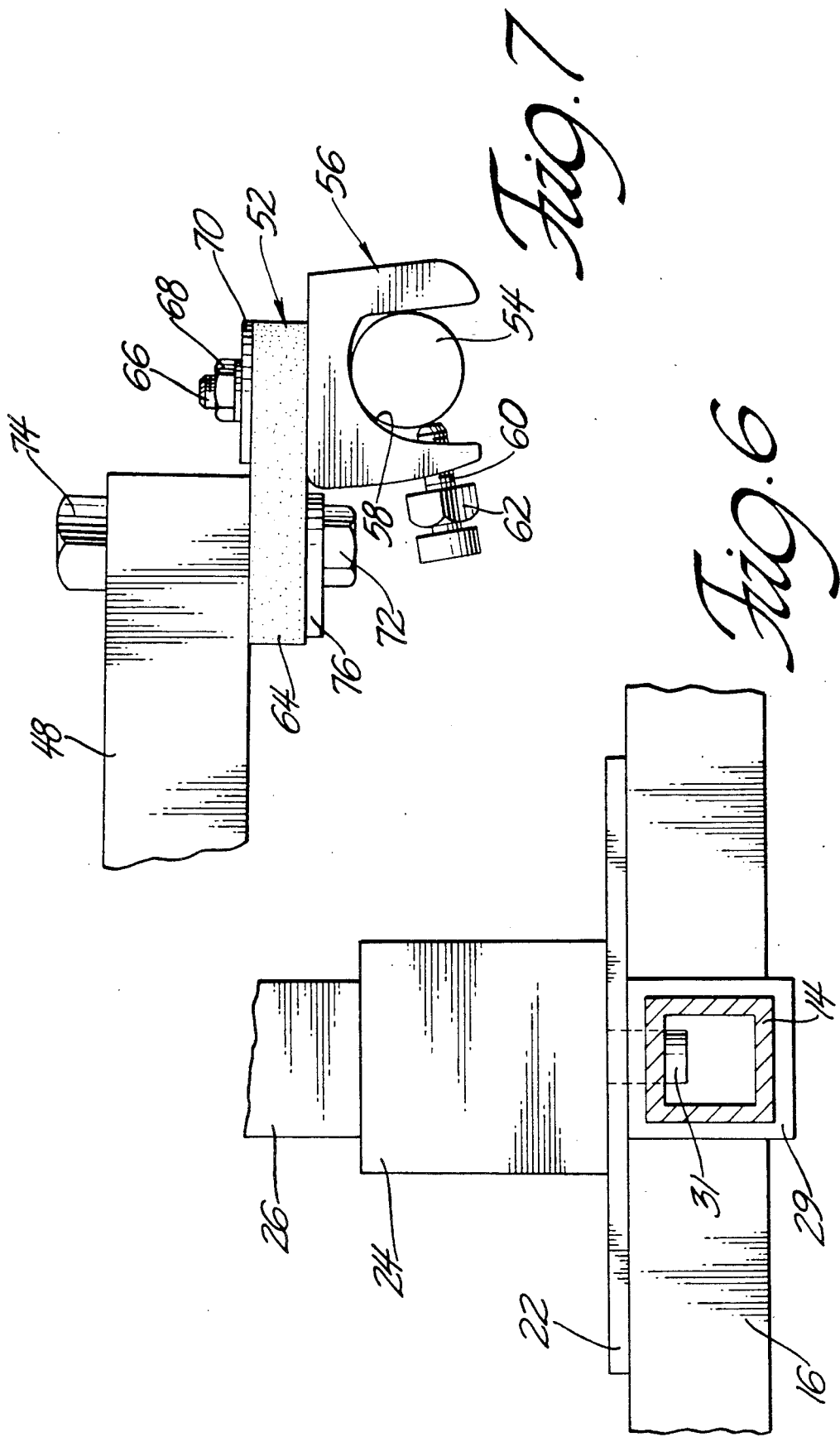

COMBINED TRAILER/WHEELCHAIR

BACKGROUND OF THE INVENTION

There is a rapidly growing market for personal or one person utility carts for use both indoors and outdoors. Most frequently such carts have been used by people who have been permanently or temporarily incapacitated in a way that makes walking difficult or impossible.

Since such carts are designed for inside use, they are of a width which enables them to pass easily through normal door openings. Such carts frequently have sufficient power to transport two adults, however, their size precludes this possibility.

The subject invention is directed to designing a trailer which may be coupled to such powered cart to enable the transporting of two adults. By way of example, it is not uncommon for two adults each to be incapacitated in a degree which makes walking essentially impossible. Rather than the necessity of buying two powered carts, the present invention enables the alternative of a relatively inexpensive and highly portable trailer which may be coupled to such a powered cart for the purpose of transporting two adults.

Another category of use for the present invention is to provide multiple person transport within offices or factories which cover large areas.

PRIOR ART

Applicant is unaware of a one person trailer designed to be coupled to an electrically powered one person cart. Applicant is further unaware of such a trailer which when uncoupled from the powered cart can also function as a wheelchair. Finally, applicant is unaware of any such trailer which is of a lightweight construction and which can be simply disassembled for transportation within the trunk of a car.

Applicant is aware of powered utility vehicles, such as golf carts, which are capable of transporting more than one adult person. However, such utility vehicles are normally too wide to be used in a home or office and, in any case, such utility carts are too wide to pass through normal door openings.

SUMMARY OF THE INVENTION

Powered utility carts of the type with which the subject invention is to be utilized are normally very compact and adapted to be disassembled for transportation in a normal size car or station wagon. Consistent with the criteria of easy transportability within a larger vehicle, the trailer/wheelchair of the subject invention must also be of lightweight construction and easily disassembled for easy transport.

More specifically, the trailer of the subject invention comprises a generally T-shaped frame having a longitudinal beam and a transverse beam assembled therewith at the rear end of the longitudinal beam and with the transverse beam adapted to support a pair of laterally spaced rear wheels. A plate upon which the trailer occupant can rest his or her feet is secured to the forward end of the longitudinal beam while a second and smaller plate is secured to the transverse beam and spans the junction of the longitudinal and transverse beams. The second plate supports a pedestal upon which a trailer seat is mounted. A pair of retractable or removable caster-type smaller wheels are disposed at the front end of the frame subadjacent the foot-supporting plate and which caster-type wheels are adapted to engage the ground when the trailer is to function as a wheelchair but are out of contact with the ground when the trailer is coupled to a powered cart. The trailer also includes a tow bar through which the trailer may be coupled to the powered cart and which tow bar may be telescoped within or removed from the longitudinal beam when the trailer is to function as a wheelchair.

The trailer also includes a pair of laterally spaced arms projecting rearwardly and downwardly from the transverse beam and which arms serve several functions. Since such trailer is very compact and relatively short in length, a sudden rearward thrusting or movement of the trailer by the occupant might cause the trailer to tip backward. The frame arms prevent such inadvertent backward tilting. Further, disassembly of the trailer is often most easily accomplished by lifting up on the front end of the trailer to bring the same to a more comfortable working height. The rearwardly projecting frame arms stabilize such lifting movement by causing the rear wheels to be lifted off the ground to thereby prevent the trailer from moving as it is being assembled or disassembled.

The details and operating features of the subject invention will be clearly understood from the following description of a preferred embodiment thereof selected for the purposes of illustration and having reference to the drawings wherein:

BRIEF DESCRIPTION OF THE DRAWINGS

FIG. 6 is an end view along line 6—6 of FIG. 4.

FIG. 7 is an enlarged view of the trailer tow bar and hitch mechanism by which the trailer is coupled to a powered cart.

DESCRIPTION OF PREFERRED EMBODIMENT

Figure 1:
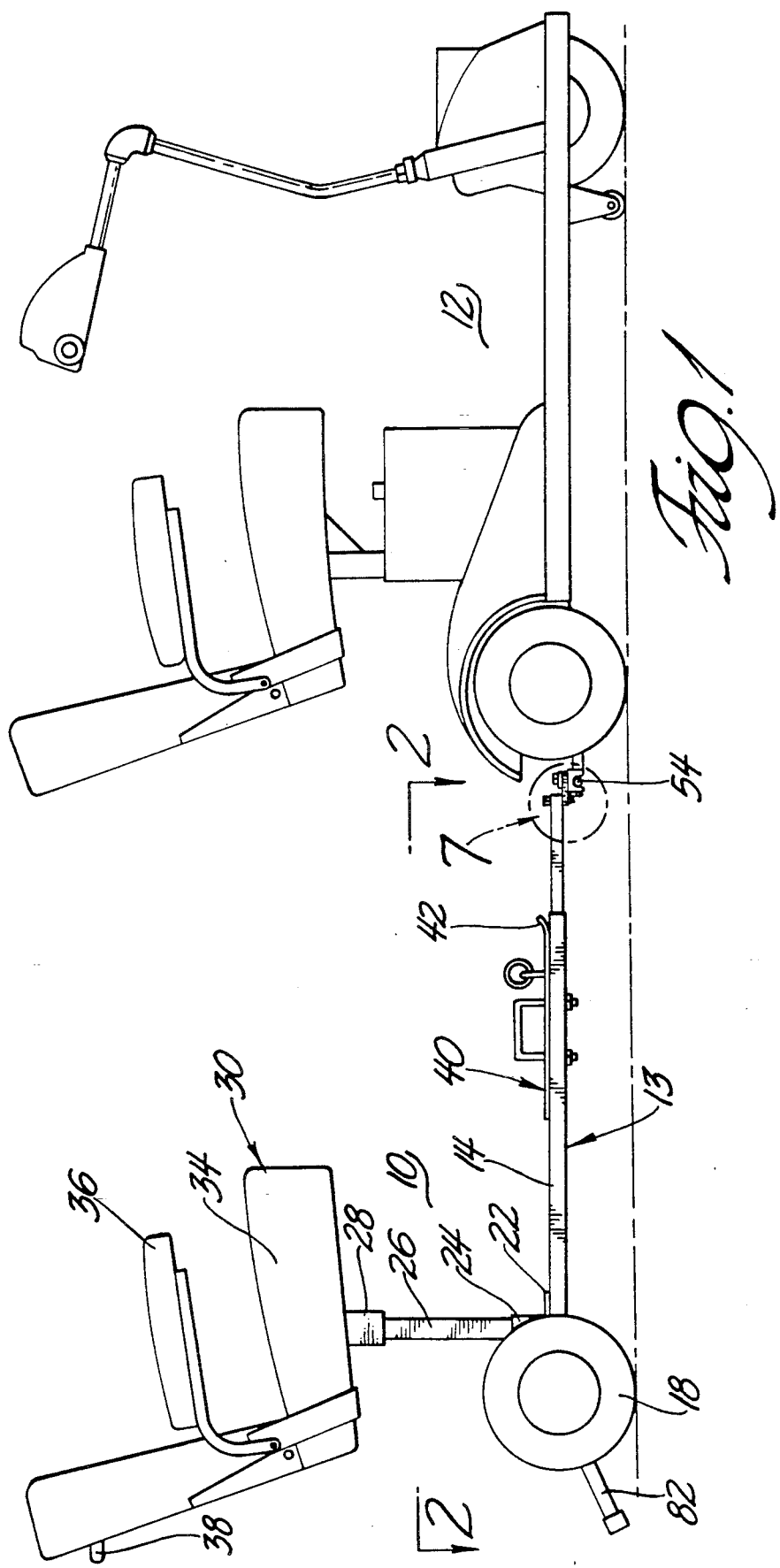
FIG. 1 is a side elevational view of the combined trailer/wheelchair coupled to a powered cart.

As best seen in FIG. 1, the trailer of the subject invention is indicated at 10 and is shown coupled to a powered utility cart indicated generally at 12. Powered cart 12 forms no part of the subject invention which is limited to the details of trailer 10. The structural and functional details of the trailer/wheelchair of the present invention will most clearly be seen by reference to FIGS. 2-5 of the drawings.

Figure 2:
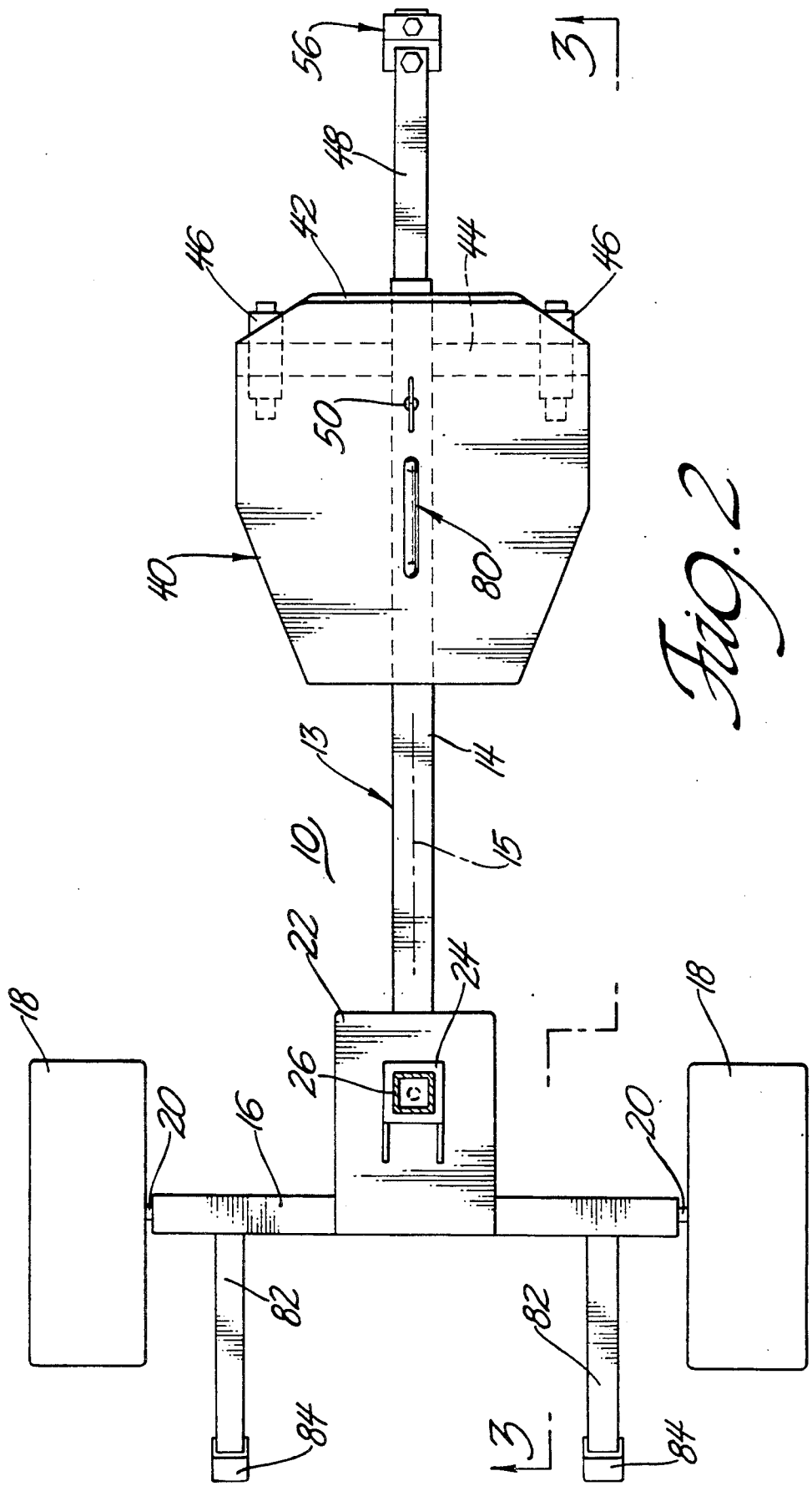
FIG. 2 is a plan view of the trailer taken along line 2—2 of FIG. 1.

As best seen in FIG. 2, trailer 10 includes a generally T-shaped frame 13 having a longitudinal axis 15. Frame 13 includes a longitudinal beam 14 and a transverse beam 16 adapted to be assembled to the rear end of the longitudinal beam. The longitudinal and transverse beams are preferably hollow and of a rectangular cross section. Rear wheels 18 are suitably mounted through axles 20 to the laterally outer ends of the transverse beam.

A first plate 22 is suitably welded or otherwise secured at the midportion of the transverse beam and extends forwardly therefrom. A tubular receptor 24 is integrally formed with or otherwise secured to plate member 22 and is adapted to removably receive a pedestal member 26 which, in turn, is adapted to receive and support a second receptor member 28 integrally formed with a passenger seat 30. Once again, it is preferred that the cross sections of the receptors 24, 28 and the pedestal 26 be rectangular. Receptor 24 is disposed forwardly of the axis of rotation of wheels 18 sufficiently that the center of gravity of the occupant also falls forwardly of said axis and creates a moment tending to rotate the longitudinal beam in a clockwise direction as viewed in FIG. 3.

Figure 4:
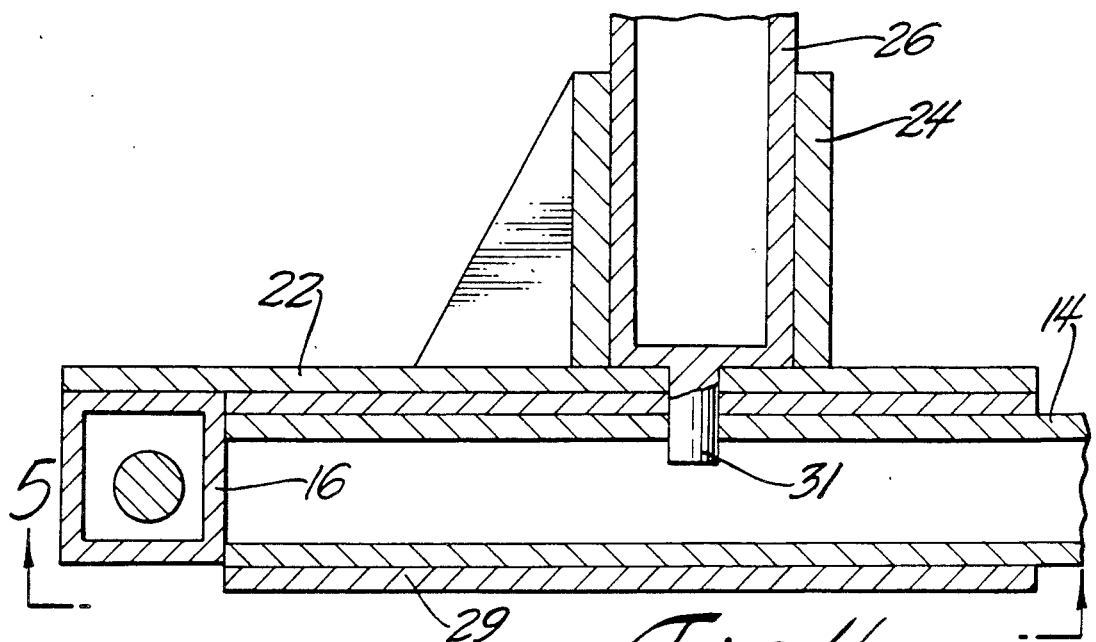
FIG. 4 is an enlargement of the circled area of FIG. 3.
Figure 5:
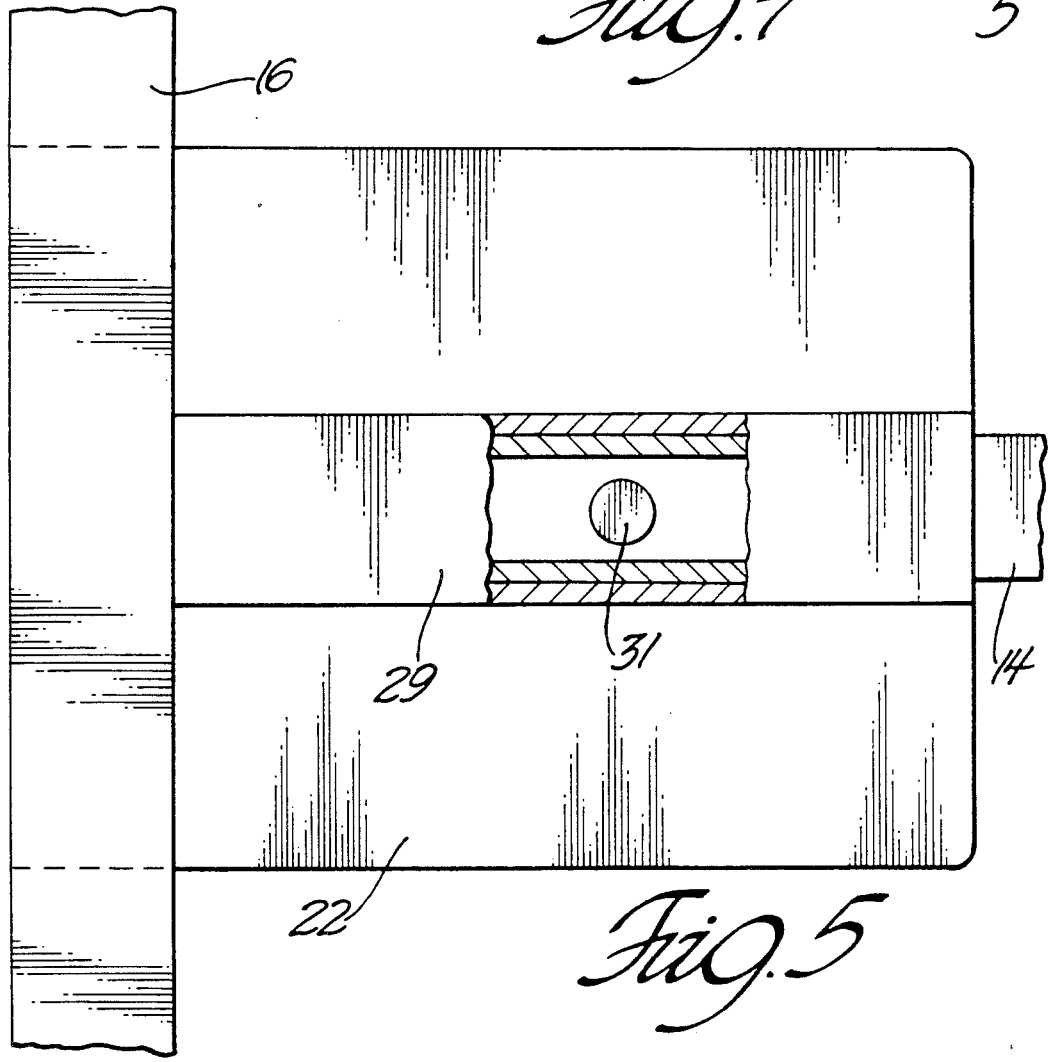
FIG. 5 is a bottom view along line 5—5 of FIG. 4.

As best seen in FIGS. 4 through 6 a third tubular receptor of rectangular cross section is indicated at 29 and is butt welded or otherwise integrally secured to transverse beam 16 at its lateral midpoint. The rear end of longitudinal beam 14 telescopes within receptor 29 and is thus assembled to the transverse beam to form the T-shaped frame 13. Aligned vertical holes are formed through plate 22, receptor 29 and longitudinal beam 14. A pin or stud 31 is integrally secured to the bottom of pedestal 26 and is adapted to project through the aligned plate, receptor and beam holes to retain the beam 14 within receptor 29.

It is preferred that longitudinal and transverse beams 14 and 16 as well as pedestal 26 be of the same cross-sectional shape and size while receptors 26, 28 and 29 are proportionally larger.

While locking means may be provided, it has been found to be sufficient to have a sliding friction fit between the seat pedestal 26 and the coacting receptors 24 and 28 such that the seat may be easily removed from the pedestal and the pedestal removed from the frame receptor 24. It is also intended that a seat back 32 be suitably articulated to a seat bottom 34 so that the seat back may be folded forwardly upon the seat bottom for easy storage. A suitable latch mechanism, not shown, is provided to prevent the inadvertent forward tilting of the seat back. Likewise, seat arms 36 may be also articulated relative to the seat back again to facilitate folding of the arms for compact storage of the disassembled trailer parts.

A suitable handle 38 is secured to the rear side of the seat back to enable the trailer to be pushed when it is uncoupled from the motorized cart 12 and is intended to function as a wheelchair pushed by a mobile person.

Again, as best seen in the plan view of FIG. 2, a second plate 40 is integrally mounted upon the longitudinal beam 14 such that the forward end of the plate terminates proximate the forward end of the beam. Plate 40 may be of any suitable shape and is adapted to support the trailer passenger's feet. To keep the passenger's feet from slipping off the forward end thereof, the forward end of plate is curved upwardly to provide a lip 42.

A forward and laterally shorter transverse beam 44 is integrally formed with longitudinal beam 14 and is disposed proximate the forward end of the latter beam. Caster-type small wheels 46 are mounted upon forward transverse beam 44. What is meant by a caster-type wheel is simply a wheel that is adapted to freely rotate about a vertical axis through 360 degrees. As seen in FIG. 1, the caster wheels of this embodiment are removable from forward transverse beam 44 when the trailer is coupled to the powered cart 12. While shown as being removable from the cart frame, the caster wheels may also be mounted in a suitable manner as to be retractable relative to the frame and in a way as to be moved out of engagement with the ground when the trailer is coupled to the powered cart. It is also contemplated that the forward transverse beam 44 might be eliminated and the front caster wheels supported directly to the foot supporting plate 40. These modifications are intended to fall within the scope of the present invention.

Figure 3:
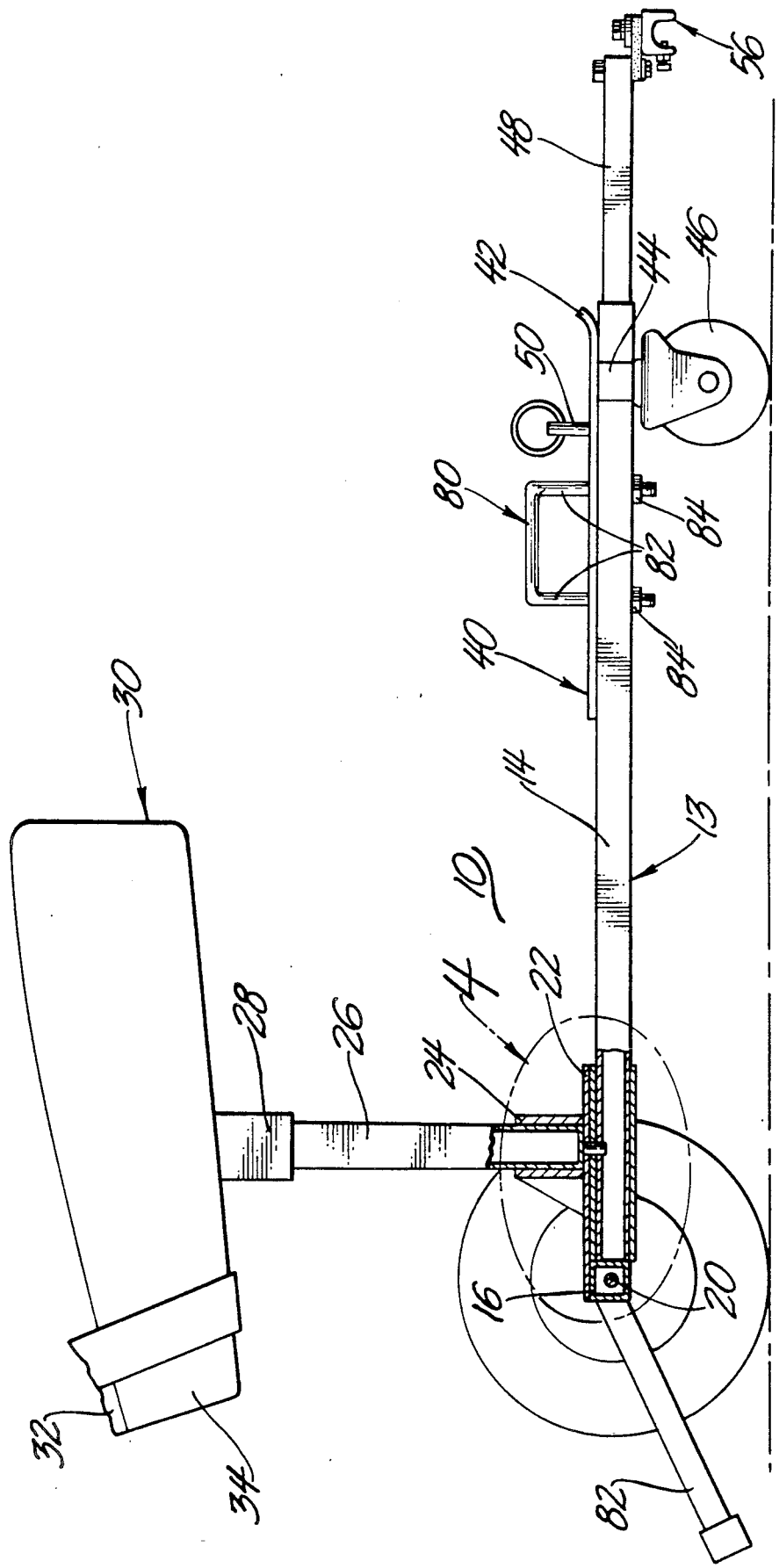
FIG. 3 is an enlarged side elevation of the trailer along line 3—3 of FIG. 2.

A tow bar 48 is adapted to be slidably received within the forward end of longitudinal beam 14 and to project forwardly from said beam when the trailer is to be coupled to a powered cart. In order to retain the tow bar within the longitudinal beam for towing purposes, a suitable retaining pin 50 is provided and is adapted to project through plate 40, beam 14 and the tow bar 48 to retain the latter to the longitudinal beam. When the trailer is to function as a wheelchair, pin 50 can be withdrawn enabling the tow bar to be removed from the longitudinal beam or to be telescoped therewithin for storage purposes. In any case, the tow bar 48 is not intended to be in its forwardly projected position, as shown in FIGS. 1, 2 and 3 when the trailer is to function as a wheelchair.

As best seen in the enlarged view of FIG. 7, a hitch device, indicated generally at 52, is mounted at the forward end of tow bar 48 and is adapted to be suitably coupled to a transverse tow rod 54 secured to the powered cart 12. The hitch mechanism includes an inverted U-shaped element 56 having a generally arcuate interior surface 58 adapted to coact with the circular tow rod 54. A suitable locking screw 60 is threadably mounted within the U-shaped element 56 so as to lockingly retain the U-shaped element to the tow rod. Once the screw member 60 is suitably adjusted with respect to the tow rod, a nut 62 may be threaded against the outer surface of the element to lock the screw in its adjusted position.

An elastomeric or flexible element 64 is provided to adjustably connect the U-shaped element 56 to the forward end of tow bar 48. More specifically, flexible element 64 may be of a construction similar to that of a radial tire wherein woven metal strands are encapsulated within a synthetic rubber material. Such construction has been found to be well able to withstand the towing and flexure forces associated with towing the trailer. More specifically, U-shaped hitch element 56 is joined to elastomeric member 64 through a suitable stud and bolt members 66 and 68 and protected by an intermediate reinforcing plate or washer 70. Likewise, the rearward end of elastomeric element 64 is suitably connected to the tow bar through a suitable nut and bolt device 72 and 74 again utilizing a reinforcing plate 76 between the bolt head and the elastomeric member.

As so constructed, the hitch mechanism represents a flexible connection between the tow bar and the towing cart wherein the U-shaped hitch element 56 may move vertically and twist relative to tow bar 48.

While the preferred embodiment utilizes the illustrated elastomeric connection between the tow bar 48 and hitch device 52, it is obvious that other types of connections, such as a ball joint, can be utilized to provide relative universal movement between the tow bar and the hitch mechanism.

Referring again to FIGS. 2 and 3, a U-shaped handle 80 is secured to the longitudinal beam 14 through threaded arms 82 and nuts 84. If the tow bar 48 is to be telescoped within the longitudinal beam for storage purposes, handle 80 can be integrally secured to the foot plate 40 so as not to obstruct the sliding movement of the tow bar within the longitudinal beam. Handle 80 is located approximately at the center of gravity of trailer 10 when no passenger is carried thereon. The handle 80 is used to lift the trailer as for ease of disassembly or otherwise.

As shown in FIGS. 1-3, arms 82 project rearwardly and downwardly from rear transverse beam 16. The arms 82 project rearwardly beyond the outer diameters of the rear wheels 18 and terminate in ends vertically spaced above the ground. Suitable protective caps 84 may be slipped over the outer end of arms 82. Arms 82 serve several purposes. First, since trailer 10 is relatively short in length particularly as relates to a seated passenger, a sudden or inadvertent rearward movement by the passenger could tend to cause the trailer to rotate backwardly when the trailer is uncoupled from a towing cart and is otherwise intended to function as a wheelchair. Arms 82 prevent such unintended rearward rotation of the trailer by engaging the ground at the outset of such rotation. Next, when the trailer is intended to be lifted by handle 80 for disassembly or other purposes, arms 82 once again engage the ground causing wheels 18 to be lifted off the ground and thereby preventing the trailer from inadvertent rolling movement and, for example, making disassembly easier.

As illustrated, arms 82 are integrally mounted to transverse beam 16. It is also contemplated that such arms could be adjustably mounted upon the transverse beam if it was desired to vary the functioning of the arms as, for example, to retract or pivot the arms in such a way as to prevent their engagement with the ground when someone wished to use the handle 38 to push the trailer over a considerable distance and found arms 82 to be in the way.

In order to allow for compact storage or transport of trailer 10, disassembly may be as follows. Seat 30 is removed from pedestal 26 which is, in turn, removed from receptor 24. Pedestal pin 31 being removed, longitudinal beam 14 is removed from receptor 29. Tow bar 48 is wither telescoped within or removed from longitudinal beam 14.

It is obvious that other modifications of the invention are possible within the intended scope of the invention as set forth in the hereinafter appended claims.

What is claimed is:

1. A combined trailer/wheelchair comprising a frame (13), a pair of laterally spaced and aligned wheels (18) rotatably supported proximate the rear end of said frame, said wheels having a common axis of rotation extending normally to a longitudinal frame axis (15), a pedestal (26) mounted upon said frame and longitudinally spaced forwardly of the axis of rotation of said wheels, a passenger seat (30) supported upon said pedestal, said frame including a foot support portion (40) disposed proximate the forward end of said frame, a tow bar (48) mounted along the longitudinal axis of said frame, means (50) for retaining said tow bar in a position projecting forwardly of said frame, a pair of caster-type wheels (46) transversely spaced and mounted upon said frame proximate the forward end of said frame, said caster-type wheels being movable to be non supportive of said frame when the tow bar is in its forwardly projecting position, and a hitch device (56) secured to the forward end of said tow bar and adapted to be removably connected to a towing cart.

2. A combined trailer/wheelchair comprising a frame (13), a pair of laterally spaced and aligned wheels rotatably supported proximate the rear end of said frame, said wheels having a common axis of rotation extending normally to a longitudinal frame axis (15), a pedestal (26) mounted upon said frame and longitudinally spaced forwardly of the axis of rotation of said wheels, a passenger seat (30) supported upon said pedestal, said frame including a foot support portion (40) disposed proximate the forward end of said frame, a tow bar (48) mounted along the longitudinal axis of said frame, means (50) for retaining said tow bar in a position projecting forwardly of said frame, a pair of caster-type wheels (46) transversely spaced and mounted upon said frame proximate the forward end of said frame said caster-type wheels being movable to be non supportive of said frame when the tow bar is in its forwardly projecting position, and a hitch device (52) secured to the forward end of said tow bar and adapted to be removably connected to a towing cart, and a pair of arms (82) projecting rearwardly and downwardly from the rear end of said frame, said arms being transversely spaced on opposite sides of the frame axis, said arms including outer ends extending radially beyond the outer diameters of said rear wheels.

3. A combined trailer/wheelchair as set forth in claim 1 wherein said hitch device includes a clamp member (56) adapted to be removably connected to a cart towing element (54), an adjustable element (64) connecting said clamp member and said tow bar whereby said clamp member can articulate relative to said tow bar.

4. A combined trailer/wheelchair as set forth in claim 3 wherein said clamp member (56) is of an inverted U-shape adapted to straddle a cart towing element (54) and includes means (60, 62) for removably locking the clamp member to the cart towing element.

5. A combined trailer/wheelchair as set forth in claim 3 wherein said flexible element supports the clamp member (56) forwardly of the tow bar (48).

6. A combined trailer/wheelchair as set forth in claim 1 wherein said frame comprises a longitudinally extending beam (14) having an axis coincident with the frame axis, a transverse beam (16) adapted to be assembled to the rear end of the longitudinal beam and including outer ends laterally equidistant from the frame axis, said rear wheels (18) being rotatably supported to the outer ends of the transverse beam, a receptor (29) integrally secured to the midpoint of the transverse beam and having an axis coincident with the frame axis, said longitudinal beam adapted to slide within and be supported by the receptor, a first plate member (22) overlaying and extending forwardly of the junction of said transverse beam and the receptor and integrally secured thereto, an upwardly opening second receptor member (24) integral with said first plate member and adapted to receive and support the seat pedestal (26), and a second plate member (40) spaced forwardly of the first plate member and terminating proximate the forward end of the longitudinal beam, said second plate member being integrally secured to the upper surface of the longitudinal beam.

7. A combined trailer/wheelchair as set forth in claim 6 wherein the longitudinal beam (14) is hollow and said tow bar (48) is adapted to be retained within said longitudinal beam.

8. A combined trailer/wheelchair as set forth in claim 7 wherein the tow bar retaining means includes a pin (50) adapted to project through said second plate member (40), said longitudinal beam (14) and the tow bar (48) to removably retain the tow bar in its forwardly projecting position.

9. A combined trailer/wheelchair as set forth in claim 6 which includes a pair of arms (82) projecting rearwardly and downwardly from said transverse beam (16), said arms being equally laterally spaced on opposite sides of the longitudinal beam (14), said arms including outer ends extending radially beyond the outer diameters of said rear wheels (18).

* * * * *